United States Patent
Angermayer

(10) Patent No.: US 10,496,530 B1
(45) Date of Patent: Dec. 3, 2019

(54) REGRESSION TESTING OF CLOUD-BASED SERVICES

(71) Applicant: SAP SE, Walldorf (DE)

(72) Inventor: Thomas Angermayer, Stetten (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/001,903

(22) Filed: Jun. 6, 2018

(51) Int. Cl.
G06F 11/36 (2006.01)
G06F 16/23 (2019.01)

(52) U.S. Cl.
CPC ...... G06F 11/3688 (2013.01); G06F 11/3672 (2013.01); G06F 11/3684 (2013.01); G06F 11/3692 (2013.01); G06F 16/2358 (2019.01)

(58) Field of Classification Search
CPC ............. G06F 11/3668; G06F 11/3672; G06F 11/3684; G06F 11/3688; G06F 11/3692; G06F 16/2358; G06F 9/451
USPC ................................ 717/124–127, 134, 135
See application file for complete search history.

(56) References Cited

U.S. PATENT DOCUMENTS

| | | | | |
|---|---|---|---|---|
| 8,914,675 | B2* | 12/2014 | Hatano | G06F 11/263 714/32 |
| 9,703,694 | B2* | 7/2017 | Li | G06F 11/3692 |
| 9,753,841 | B1* | 9/2017 | Shen | G06F 11/368 |
| 10,078,579 | B1* | 9/2018 | Joshi | G06F 11/3688 |
| 10,162,849 | B1* | 12/2018 | Elgarat | G06F 16/2365 |
| 2006/0167873 | A1* | 7/2006 | Degenaro | G06F 9/45512 |
| 2010/0005341 | A1* | 1/2010 | Agarwal | G06F 11/3688 714/38.11 |
| 2011/0246971 | A1* | 10/2011 | Chua | G06F 11/3414 717/135 |
| 2013/0047140 | A1* | 2/2013 | Shann | G06F 11/3664 717/128 |
| 2014/0325486 | A1* | 10/2014 | Zhang | G06F 11/3692 717/125 |
| 2018/0285249 | A1* | 10/2018 | Hanumanthappa | G06F 11/3688 |

OTHER PUBLICATIONS

Rajal, J., S., et al., A Review on Various Techniques for Regression Testing and Test Case Prioritization, International Journal of Computer Applications, vol. 116—No. 16, Apr. 2015, pp. 8-13, [retrieved on Jul. 8, 2019], Retrieved from the Internet.*

(Continued)

*Primary Examiner* — Geoffrey R St Leger
(74) *Attorney, Agent, or Firm* — Mintz Levin Cohn Ferris Glovsky and Popeo, P.C.

(57) ABSTRACT

A method for regression testing may include detecting a client request sent from a client to a cloud-based service. One or more actions triggered at the cloud-based service by the one or more actions may be detected. The one or more actions may include a change to a database coupled with the cloud-based service. A test case may be generated for regression testing the cloud-based service. The test case may include the client request and an expected result of the client request. The expected result of the client request may include the one or more actions triggered at the cloud-based service by the client request. The cloud-based service may be regression tested by at least executing the test case. Related systems and articles of manufacture, including computer program products, are also provided.

16 Claims, 5 Drawing Sheets

(56) References Cited

OTHER PUBLICATIONS

Makki, M., et al., Automated Workflow Regression Testing for Multi-tenant SaaS, Proceedings of the 7th International Workshop on Automating Test Case Design, Selection, and Evaluation, Nov. 18-18, 2016, pp. 70-73, [retrieved on Jul. 8, 2019], Retrieved from the Internet.*

* cited by examiner

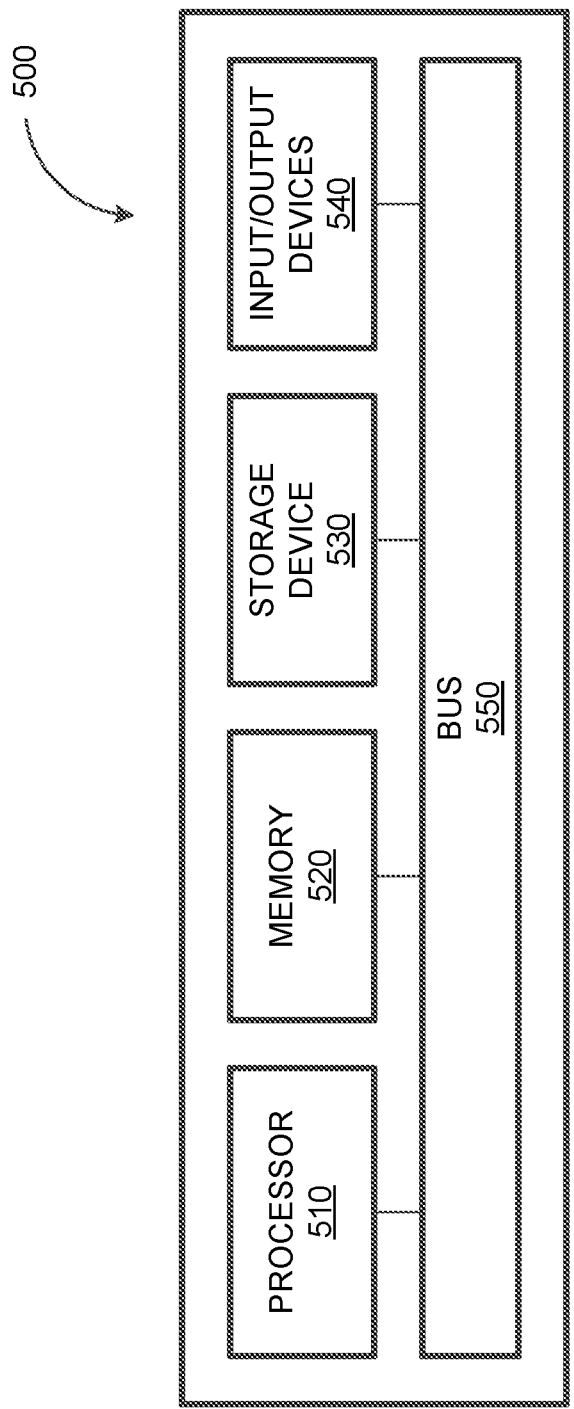

REGRESSION TESTING OF CLOUD-BASED SERVICES

TECHNICAL FIELD

The subject matter described herein relates generally to software testing and more specifically to regression testing of a cloud-based service.

BACKGROUND

Cloud computing may refer to a shared pool of software and/or hardware resources that may be accessed remotely, for example, over the Internet. A cloud-computing provider may offer a variety of cloud-based services including, for example, infrastructure as a service (IaaS), platform as a service (PaaS), software as a service (SaaS), and/or the like. Maintenance for a cloud-based service may include updating the cloud-based service to correct defects, add features, and/or improve performance, typically after the cloud-based service has been released into a production environment. The updated cloud-based service may be subject to regression testing to ensure that the updates to the cloud-based service did not adversely affect any existing functionalities.

SUMMARY

Systems, methods, and articles of manufacture, including computer program products, are provided for regression testing of cloud-based services. In one aspect, there is provided a system. The system may include at least one data processor and at least one memory. The at least one memory may store instructions that result in operations when executed by the at least one data processor. The operations may include: detecting a client request, the client request being sent from a client to a cloud-based service; detecting one or more actions triggered at the cloud-based service by the client request, the one or more actions including a change to a database coupled with the cloud-based service; and generating a test case for regression testing the cloud-based service, the test case including the client request, the test case further including an expected result of the client request, and the expected result of the client request comprising the one or more actions triggered at the cloud-based service by the client request.

In some variations, one or more features disclosed herein including the following features can optionally be included in any feasible combination. The change to the database may be detected based on a difference in a state of the database before the client request is fulfilled by the cloud-based service and a state of the database after the client request is fulfilled by the cloud-based service. The difference may indicate an addition of data to the database and/or a modification of data in the database.

In some variations, the detecting of the one or more actions may include detecting a query to store, modify, and/or retrieve data from the database.

In some variations, a response that is sent to the client from the cloud-based service in response to the client request may be detected. The test case may be generated to include the response as part of the expected result of the client request. The client request and/or the response may be detected by at least detecting an exchange of data between the client and the cloud-based service. The exchange of data may be conducted via a user interface generated by a presentation layer of the cloud-based service. The response may include a confirmation that the client request is fulfilled and/or data retrieved from the database.

In some variations, the cloud-based service may be regression tested by at least executing the test case. The test case may be executed by at least sending, to the cloud-based service, the client request included in the test case. An actual result of the client request may be determined by at least detecting an action and/or a response triggered at the cloud-based service by the client request. The cloud-based service may be determined to pass the test case based at least on a difference between the actual result of the client request and the expected result of the client request not exceeding a threshold value.

In some variations, the expected result of the client request may include a first change to the database. The actual result of the client request may include a second change to the database. The cloud-based service may be determined to pass the test case based at least on a difference between the first change and the second change not exceeding the threshold value.

In some variations, the cloud-based service may include a hardware resource and/or a software resource that is remote to the client and accessible to the client via a wired and/or wireless network. The cloud-based service may be an infrastructure as a service (IaaS), a platform as a service (PaaS), and/or a software as a service (SaaS).

In some variations, the one or actions may further include a change to a state of the cloud-based service. The state of the cloud-based service may include a quantity of active client sessions and/or a quantity of pending client requests.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a block diagram illustrating a computing system, in accordance with some example embodiments.

When practical, similar reference numbers denote similar structures, features, or elements.

DETAILED DESCRIPTION

Regression testing a cloud-based service may including testing the existing functionalities of the cloud-based service after an update to the cloud-based service in order to ensure that the update did not adversely affect any of the existing functionalities. For example, regression testing the updated cloud-based service may include executing a test suite containing a collection of test cases. The test suite should ideally include test cases covering every use case scenario that may arise when different clients interact with the cloud-based service. However, generating such a comprehensive test suite for regression testing may require exorbitant resources. As such, in some example embodiments, a regression testing controller may be configured to generate test cases based on one or more client interactions with a cloud-based service. For instance, the regression testing controller may generate test cases based on client requests sent to the cloud-based service as well as the actions triggered by the client requests including, for example, queries made to a database associated with the cloud-based service in order to fulfill the client requests, responses from the cloud-based service, and/or the like. The actions triggered by the client requests can further include changes to a state of the cloud-based service such as, for example, a quantity of active client sessions, a quantity of pending client requests, and/or the like. These test cases may be executed during regression testing of the cloud-based service, for example, after the cloud-based service has undergone one or more updates.

Figure 1:
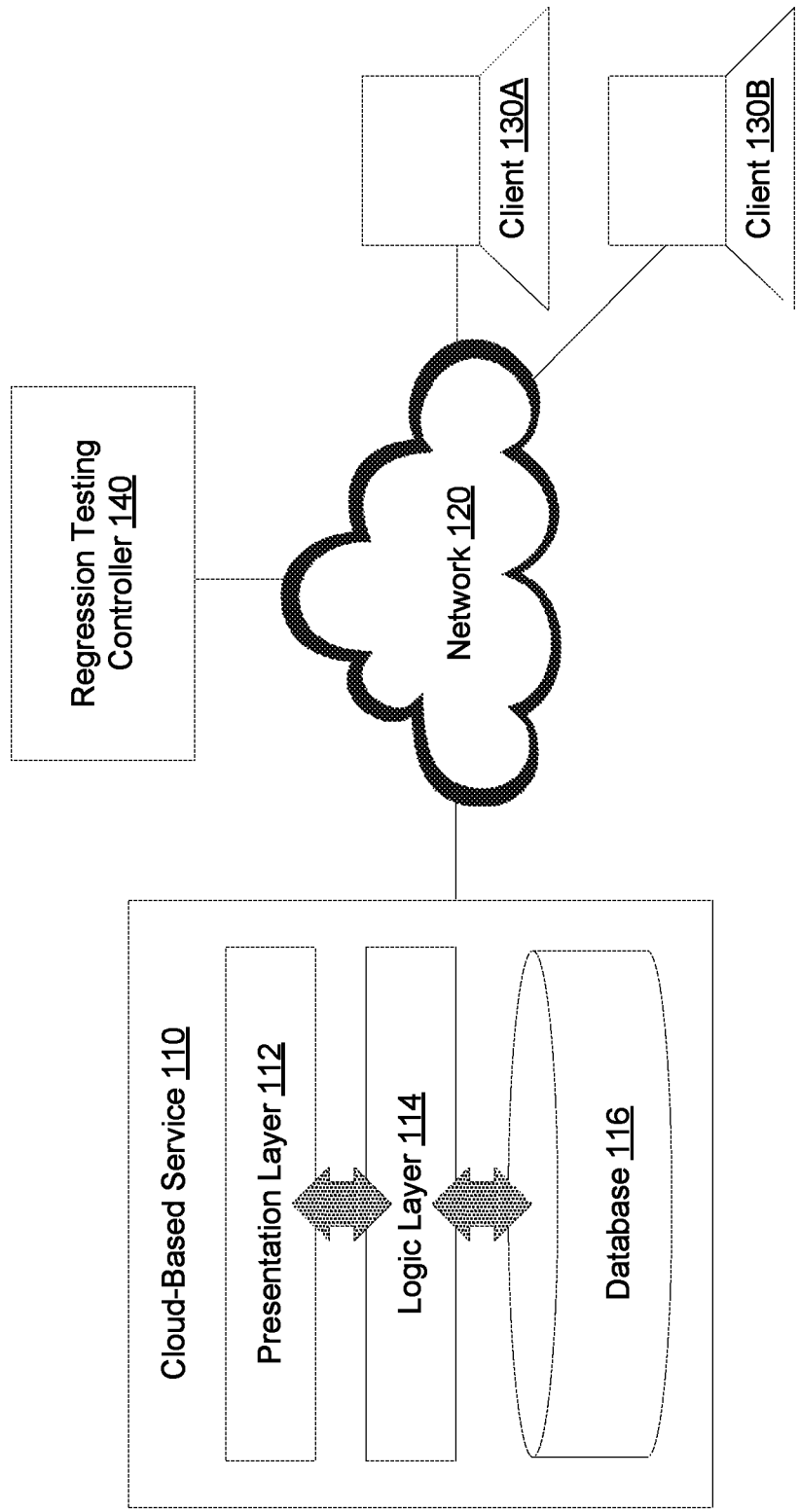
FIG. 1 depicts a system diagram illustrating a cloud computing system, in accordance with some example embodiments.

FIG. 1 depicts a system diagram illustrating a cloud computing system 100 consistent with implementations of the current subject matter. Referring to FIG. 1, the cloud computing system 100 may include a cloud-based service 110 serving one or more clients including, for example, a first client 130A, a second client 130B, and/or the like. For instance, as shown in FIG. 1, the first client 130A and/or the second client 130B may access the cloud-based service 110 via a network 120. It should be appreciated that the cloud-based service 110 may be any hardware and/or software resource that is remote to the first client 130A and/or the second client 130B but accessible via the network 120 including, for example, infrastructure as a service (IaaS), platform as a service (PaaS), software as a service (SaaS), and/or the like. The network 120 may be any wired and/or wireless network including, for example, a public land mobile network (PLMN), a local area network (LAN), a virtual local area network (VLAN), a wide area network (WAN), the Internet, and/or the like.

As shown in FIG. 1, the cloud-based service 110 can include a presentation layer 112, a logic layer 114, and a database 116. The first client 130A and/or the second client 130B may interact with the cloud-based service 110 via the presentation layer 112, which may be configured to mediate the exchange of data between the cloud-based service 110, the first client 130A, and/or the second client 130B. For example, the presentation layer 112 may generate one or more graphic user interfaces (GUIs), which may be displayed at the first client 130A and/or the second client 130B to accept inputs from and/or provide outputs to the first client 130A and/or the second client 130B. Meanwhile, the logic layer 114 may be configured to process the data exchanged between the cloud-based service 110, the first client 130A, and/or the second client 130B. In some example embodiments, the exchange of data between the cloud-based service 110, the first client 130A, and/o the second client 130B may trigger one or more queries to the database 116.

To further illustrate, the presentation layer 112 may receive, from the first client 130A, a request to post data to the cloud-based service 110. For example, the cloud-based service 110 may be a social networking application connecting the first client 130A and the second client 130B via a social network. As such, the presentation layer 112 may receive, from the first client 130A, a request to post data (e.g., text, photographs, videos, hyperlinks, and/or the like) to the social networking application such that the data may be shared with one or more other members of the social network including, for example, the second client 130B. The logic layer 114 may respond to the request from the first client 130A by at least processing the data the first client 130A is requesting to post to the cloud-based service 110.

In some example embodiments, processing the data (e.g., text, photographs, videos, hyperlinks, and/or the like) posted by the first client 130A may include querying the database 116, for example, to store, modify, and/or retrieve data from the database 116. For example, the logic layer 114 may process the data by at least querying the database 116 to store, in the database 116, the data being posted to the cloud-based service 110. Alternatively and/or additionally, the logic layer 114 may process the data by at least querying the database 116 to modify, based on the data being posted to the cloud-based service 110, existing data in the database 116. For instance, the logic layer 114 may modify a value in the database 116 that corresponds to a quantity of data posted by the first client 130A.

In some example embodiments, the logic layer 114 may generate a response to the request from the first client 130A. For instance, the response to the request to post data to the cloud-based service 110 may include a confirmation that the request from the first client 130A has been fulfilled such as, for example, the data having been successfully posted to the cloud-based service 110. Alternatively and/or additionally, the response to the request to post data to the cloud-based service 110 may include other data retrieved from the database 116. For example, the logic layer 114 may retrieve, from the database 116, the value corresponding to the quantity of data posted by the first client 130A. The response generated by the logic layer 114 may be sent, via the presentation layer 112, to the first client 130A.

Referring again to FIG. 1, the cloud computing system 100 may include a regression testing controller 140. The regression testing controller 140 may be configured to generate test cases for regression testing the cloud-based service 110, for example, after the cloud-based service 110 has undergone one or more updates. As noted, the cloud-based service 110 may be subject to regression testing after the one or more updates in order to ensure that the updates do not adversely affect any existing functionalities of the cloud-based service 110.

The regression testing controller 140 may generate test cases for regression testing the cloud-based service 110 based on interactions between the cloud-based service 110, the first client 130A, and/or the second client 130B. According to some example embodiments, a test case may include a client request and an expected result for that client request. For example, the regression testing controller 140 may generate a test case to include the request from the first client 130A to post data to the cloud-based service 110. Furthermore, the regression testing controller 140 may generate the test case to include the one or more actions triggered by the request from the first client 130A including, for example, the queries to the database 116 to store, modify, and/or retrieve data from the database 116. Alternatively and/or additionally, the test case may also include the responses to the request sent from the cloud-based service 110 to the first client 130A which, as noted, may include a confirmation that the request from the first client 130A has been fulfilled and/or data retrieved from the database 116. It should be appreciated that the actions and/or responses triggered by the request from the first client 130A may form the expected result for the request from the client 130A. In addition to and/or instead of changes to the database 116, the expected result for the request from the client 130A can also include changes to a state of the cloud-based service 110 such as, for example, a quantity of active client sessions, a quantity of pending client requests, and/or the like.

In some example embodiments, the regression testing controller 140 may be further configured to execute a test case. As noted, a test case may include a client request and an expected result including, for example, the actions and/or responses triggered by the request. Accordingly, the regression testing controller 140 may execute the test case by sending, to the cloud-based service 110, a client request included in the test case. The regression testing controller 140 may record an actual result of sending the client request to the cloud-based service 110 including, for example, the actions and/or responses triggered at the cloud-based service 110 in response to the client request. According to some example embodiments, the regression testing controller 140 may determine that the cloud-based service 110 passed the test case if a difference between the expected result and the actual result of the client request does not exceed a threshold value. For example, the expected result of the client request to post data to the cloud-based service 110 may include modifying existing data in the database 160 to a value x whereas the actual result of the client request modified existing data in the database 160 to a different value y. The cloud-based service 110 may nevertheless pass the test case if the different between the value x and the value y do not exceed a threshold value.

Figure 2:
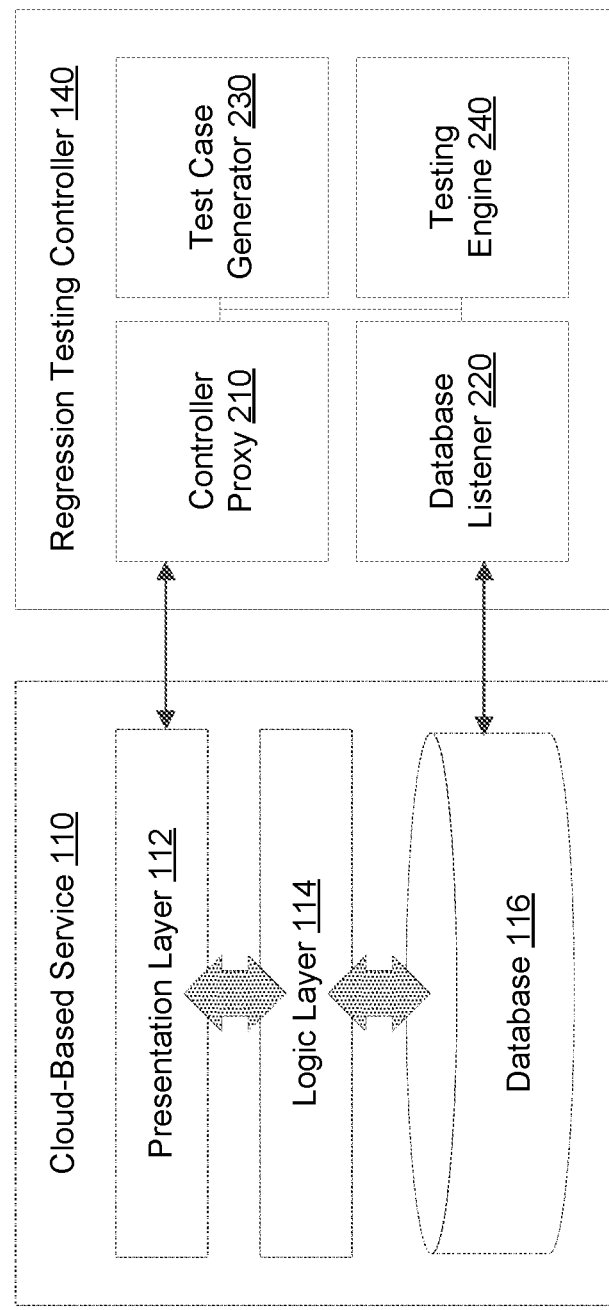
FIG. 2 depicts a block diagram illustrating a regression testing controller, in accordance with some example embodiments.

FIG. 2 depicts a block diagram illustrating the regression test controller 140, in accordance with some example embodiments. Referring to FIG. 2, the regression test controller 140 may include a controller proxy 210, a database listener 220, a test case generator 230, and a testing engine 240.

As shown in FIG. 2, the controller proxy 210 may be coupled with the presentation layer 112 of the cloud-based service 110. In some example embodiments, the controller proxy 210 may be configured to detect and/or record data exchanged between the cloud-based service 110, the first client 130A, and/or the second client 130B. For example, the controller proxy 210 may detect and/or record the request from the first client 130A to post data to the cloud-based service 110. Alternatively and/or additionally, the controller proxy 210 may detect and/or record the response to the request sent from the cloud-based service 110 to the first client 130A.

In some example embodiments, the database listener 220 may be configured to detect and/or record queries to the database 116. As noted, the logic layer 114 may respond to the request from the first client 130A by at least querying the database 116 to store, modify, and/or retrieve data from the database 116. Thus, according to some example embodiments, the database listener 220 may detect and/or record the queries made to the database 116, for example, in response to the request from the first client 130A. Alternatively and/or additionally, the database listener 220 may detect and/or record changes to the database 116 triggered by the request from the first client 130A. For instance, the changes to the database 116 may include the storage of new data and/or the modification of existing data at the database 116.

The test case generator 230 may be configured to generate one or more test cases for regression testing the cloud-based service 110, for example, after the cloud-based service 110 has undergone one or more updates. A test case may include a client request and an expected result for the client request, which may include actions and/or responses triggered by the client request. Accordingly, in some example embodiments, the test case generator 230 may generate a test case to include the request from the first client 130A to post data to the cloud-based service 110. The request from the first client 130A may be detected and/or recorded by the controller proxy 210. Furthermore, the test case generator 230 may generate the test case to include the actions and/or responses triggered by the request from the first client 130A to post data to the cloud-based service 110. As noted, the actions and/or responses triggered by the request from the first client 130A to post data to the cloud-based service 110 may form the expected result for that request. For instance, the expected result for the request may include one or more queries to the database 160 and/or changes to the database 116, which may be detected and/or recorded by the database listener 220. The changes to the database 116 may be determined by comparing a state of the database 116 before the request is fulfilled by the cloud-based service 110 and a state of the database 116 after the request is fulfilled by the cloud-based service 110. A difference in the state of the database 116 may indicate data being added to and/or modified at the database 116 as a result of the cloud-based service 110 fulfilling the request. Alternatively and/or additionally, the expected result for the request may include one or more responses sent to the first client 130A. These responses may be detected and/or recorded by the controller proxy 210. The expected result for the request can further include changes to a state of the cloud-based service 110 such as, for example, a quantity of active client sessions, a quantity of pending client requests, and/or the like.

In some example embodiments, the testing engine 240 may perform regression testing by at least executing one or more test cases generated by the test case generator 230. As noted, a test case may include a client request and an expected result for that test case. Accordingly, the testing engine 240 may execute the test case by at least sending, to the cloud-based service 110, the client request included the test case. The controller proxy 210 and/or the database listener 220 may detect and/or record the actions and/or responses triggered at the cloud-based service 110 by the client request. For example, the database listener 220 may detect and/or record queries to the database 116 and/or changes to the database 116 in response to the client request. Alternatively and/or additionally, the controller proxy 210 may detect and/or record responses sent by the cloud-based service 110 in response to the client request. These actions and/or responses may form an actual result of the client request. According to some example embodiments, the testing engine 240 may determine that the cloud-based service 110 passes the test case if a difference between the actual result of the client request and the expected result of the test case do not exceed a threshold value.

Figure 3:
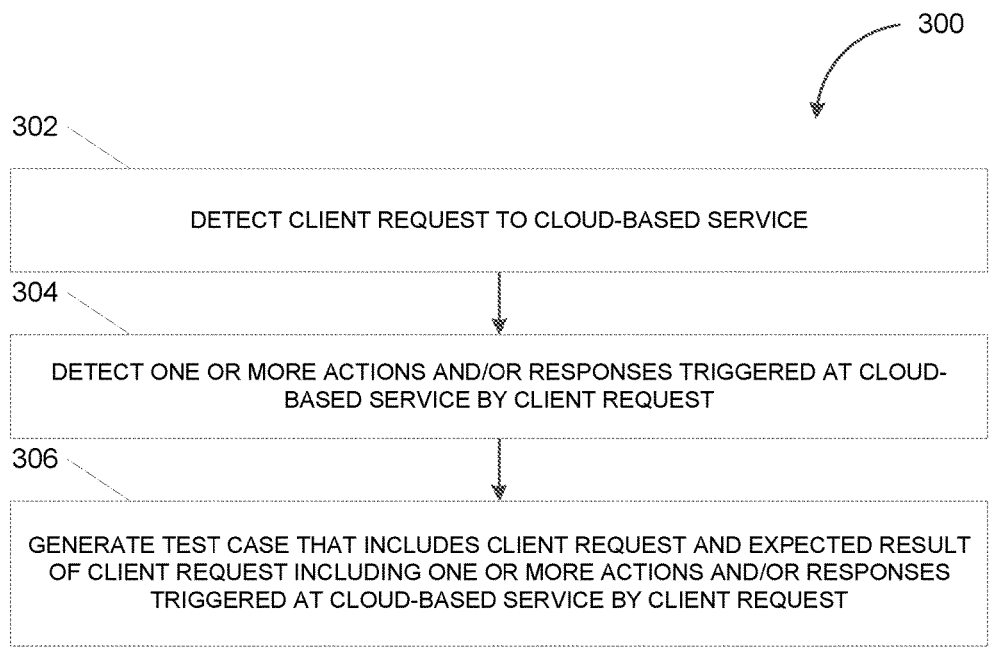
FIG. 3 depicts a flowchart illustrating a process for generating a test case, in accordance with some example embodiments.

FIG. 3 depicts a flowchart illustrating a process 300 for generating a test case, in accordance with some example embodiments. Referring to FIGS. 1-3, the process 300 may be performed by the regression testing controller 140, for example, to generate a test case for regression testing the cloud-based service 110. As noted, in some example embodiments, the cloud-based service 110 may be regression tested after one or more updates in order to ensure that the existing functionalities of the cloud-based service 110 are not adversely affected by the updates.

At 302, the regression testing controller 140 may detect a client request to the cloud-based service 110. The cloud-based service 110 may include the presentation layer 112 for mediating the exchange of data between the cloud-based service 110, the first client 130A, and/or the second client 130B. Meanwhile, the regression testing controller 140 may include the controller proxy 210, which may be coupled with the presentation layer 112 to detect and/or record the data that is exchanged between the cloud-based service 110, the first client 130A, and/or the second client 130B.

For example, the regression testing controller 140, for example, the controller proxy 210, may detect and/or record when the first client 130A sends, to the cloud-based service 110, a request to post data to the cloud-based service 110. For instance, the cloud-based service 110 may be a social networking application. As such, the first client 130A may send, to the cloud-based service 110, a request to post data (e.g., text, photographs, videos, hyperlinks, and/or the like) to the social networking application such that the data may be shared with one or more other members of the social network including, for example, the second client 130B.

At 304, the regression testing controller 140 may detect one or more actions and/or responses triggered at the cloud-based service 110 by the client request. The cloud-based service 110 may include the logic layer 114 for processing the data exchanged between the cloud-based service 110, the first client 130A, and the second client 130B. Processing this data may trigger one or more queries to the database 116 at the cloud-based service 110, for example, to store, modify, and/or retrieve data from the database 116. As such, the regression testing controller 140 may include the database listener 220, which may be coupled with the database 116 to detect and/or record queries to the database 160 and/or changes to the database 160 triggered by the request from the first client 130A. Alternatively and/or additionally, the logic layer 114 may generate one or more responses as a result of processing the data. Accordingly, the regression test controller 140 may include the controller proxy 210, which may be coupled with the presentation layer 112 of the cloud-based service 110 to detect and/or record the responses sent to the first client 130A in response to the request from the first client 130A to post data to the cloud-based service 110.

For example, the regression testing controller 140, for example, the database listener 220, may detect and/or record when the database 160 is queried to store the data being posted to the cloud-based service 110. The database listener 220 may also detect and/or record when the database 160 is queried to modify, based on the data being posted to the cloud-based service 110, existing data in the database 160. Alternatively and/or additionally, the controller proxy 210 may detect and/or record responses sent to the first client 130A in response to the request from the first client 130A to post data to the cloud-based service 110. As noted, the response to the client request may include a confirmation that data has been posted to the cloud-based service 110 and/or other data retrieved from the database 116. Furthermore, the response to the client request can include changes to a state of the cloud-based service 110 such as, for example, a quantity of active client sessions, a quantity of pending client requests, and/or the like.

At 306, the regression testing controller 140 may generate a test case that includes the client request and an expected result of the client request including the one or more actions and/or responses triggered at the cloud-based service 110 by the client request. In some example embodiments, the regression controller 140, for example, the test case generator 230, may generate one or more test cases for regression testing the cloud-based service 110. Each test may include a client request and an expected result of the client request. For example, the test case generator 230 may generate a test case that includes the request from the first client 130A to post data to the cloud-based service 110. As noted, the request from the first client 130A may be detected and/or recorded by the controller proxy 210, for example, in operation 302. Alternatively and/or additionally, the test case generator 230 may generate the test case to include the actions and/or responses triggered at the cloud-based service 110 by the request from the first client 130A. For example, the database listener 220 may detect and/or record when the database 160 is queried to store, modify, and/or retrieve data in response to the request from the first client 130A. Meanwhile, the controller proxy 210 may detect and/or record responses sent to the first client 130A from the cloud-based service 110 in response to the request from the first client 130A. According to some example embodiments, the actions and/or responses triggered by the request from the first client 130A may form the expected results included in the test case generated by the test case generator 230.

Figure 4:
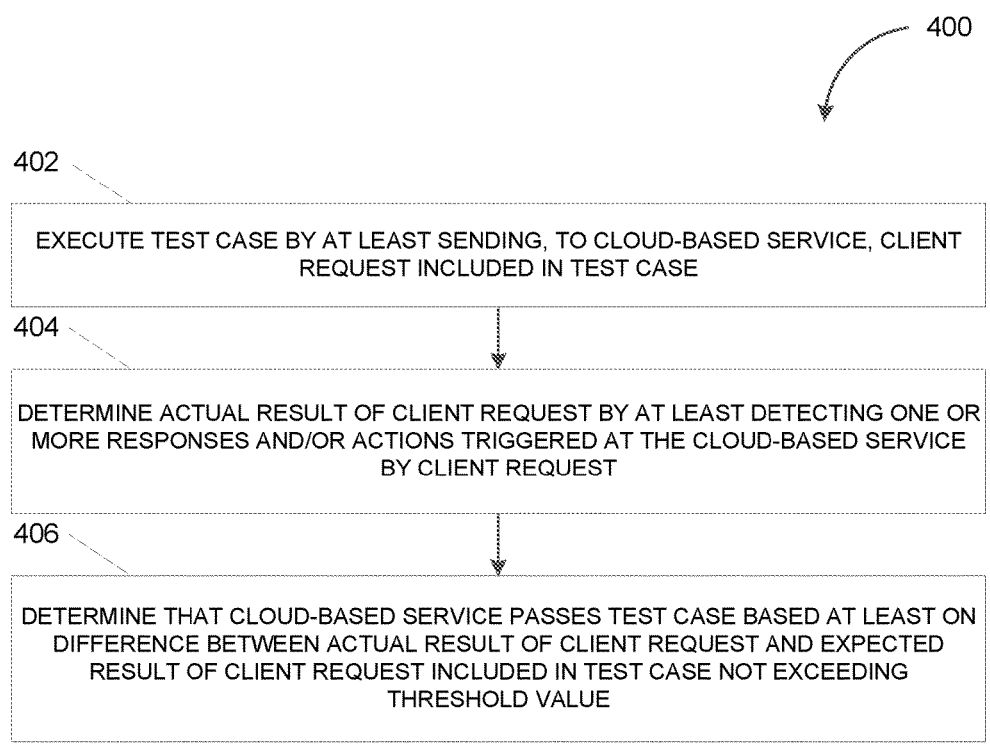
FIG. 4 depicts a flowchart illustrating a process for regression testing, in accordance with some example embodiments.

FIG. 4 depicts a flowchart illustrating a process 400 for regression testing, in accordance with some example embodiments. Referring to FIGS. 1-2, and 4, the process 400 may be performed by the regression testing controller 140, for example, to regression test the cloud-based service 110 after the cloud-based service 110 has undergone one or more updates. As noted, the cloud-based service 110 may be regression tested after the one or more updates in order to ensure that the existing functionalities of the cloud-based service 110 are not adversely affected by the updates.

At 402, the regression testing controller 140 may execute a test case by at least sending, to the cloud-based service 110, a client request included in the test case. As noted, the regression testing controller 140, for example, the test case generator 230, may generate one or more test cases, each of which including a client request and an expected result of the client request. Accordingly, in some example embodiments, the regression testing controller 140, for example, the testing engine 240, may execute a test case by at least sending, to the cloud-based service 110, the client request included in the test case. For example, the client request included in the test case may be a request to post data (e.g., text, photographs, videos, hyperlinks, and/or the like) to the cloud-based service 110.

In some example embodiments, the regression testing controller 140 may execute the test case in order to test whether the cloud-based service 110 satisfy one or more functional requirements, for example, subsequent to an update of the cloud-based service 110. Alternatively and/or additionally, the regression testing controller 140 may also execute the test case in order to test non-functional requirements such as, for example, performance, accessibility, and/or the like. For example, the regression testing controller 140 may execute the test case to determine the quantity of time required to respond to a client request included in the test case and/or whether the time required to respond to the client request exceeds a threshold value. The regression testing controller 140 may also execute the test case to gauge the accessibility of a user interface (e.g., a graphic user interface (GUI), a webpage, and/or the like) generated by the cloud-based service 110, for example, in response to the client request included in the test case.

At 404, the regression testing controller 140 may determine an actual result of the client request by at least detecting one or more responses and/or actions triggered at the cloud-based service 110 by the client request. As noted, the regression testing controller 140 may include the database listener 220, which may be coupled with the database 116 to detect and/or record queries to the database 160 and/or changes to the database 160 triggered by the client request, for example, to post data to the cloud-based service 110. Alternatively and/or additionally, the regression test controller 140 may include the controller proxy 210, which may be coupled with the presentation layer 112 of the cloud-based service 110 to detect and/or record the responses sent to the client request, for example, to post data to the cloud-based service 110. In some example embodiments, the actual result of the client request, for example, to post data to the cloud-based service 110, may include the queries and/or changes to the database 160 triggered by the client request. The actual result of the client request may further include the responses triggered by the client request, for example, to post data to the cloud-based service 110. For instance, the responses to the client request may include a confirmation that the data has been posted to the cloud-based service 110 and/or other data retrieved from the database 160 in response to the client request to post data to the cloud-based service 110.

At 406, the regression testing controller 140 may determine that the cloud-based service 110 passes the test case based at least on a difference between the actual result of the client request and an expected result of the client request included in the test case not exceeding a threshold value. In some example embodiments, the regression testing controller 140, for example, the testing engine 240, may determine that the cloud-based service 110 passes a test case if the difference between the actual result of the client request and an expected result of the client request does not exceed a threshold value. It should be appreciated that the cloud-based service 110 may pass a test case even though the actual result of the client request and the expected result of the client request are not identical. For example, the expected result of the client request to post data to the cloud-based service 110 may include modifying existing data in the database 160 to a value x whereas the actual result of the client request modified existing data in the database 160 to a different value y. The cloud-based service 110 may nevertheless pass the test case if the different between the value x and the value y do not exceed a threshold value.

FIG. 5 depicts a block diagram illustrating a computing system 500 consistent with implementations of the current subject matter. Referring to FIGS. 1 and 5, the computing system 500 can be used to implement the cloud computing system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, cloud computing system 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
      detecting a client request, the client request being sent from a client to a cloud-based service;
      detecting one or more actions triggered at the cloud-based service by the client request, the one or more actions including a first change to a database coupled with the cloud-based service;
      generating a test case for regression testing the cloud-based service, the test case including the client request, the test case further including an expected result of the client request, and the expected result of the client request comprising the first change to the database;
      regression testing the cloud-based service by at least executing the test case, the test case being executed by at least sending, to the cloud-based service, the client request included in the test case;
      determining an actual result of the client request by at least detecting an action triggered at the cloud-based service by the client request, the actual result of the client request comprising a second change to the database; and
      determining that the cloud-based service passes the test case based at least on a difference between the first change to the database and the second change to the database not exceeding a threshold value.

2. The system of claim 1, wherein the first change to the database comprises a change in a state of the database from a first state before the client request is fulfilled by the cloud-based service to a second state of the database after the client request is fulfilled by the cloud-based service.

3. The system of claim 2, wherein the change includes an addition of data to the database and/or a modification of data in the database.

4. The system of claim 1, wherein the detecting of the one or more actions comprises detecting a query to store, modify, and/or retrieve data from the database.

5. The system of claim 1, further comprising:
  detecting a response sent, in response to the client request, to the client from the cloud-based service; and
  generating the test case to include the response as part of the expected result of the client request.

6. The system of claim 5, wherein the client request and/or the response is detected by at least detecting an exchange of data between the client and the cloud-based service, and wherein the exchange of data is conducted via a user interface generated by a presentation layer of the cloud-based service.

7. The system of claim 5, wherein the response comprises a confirmation that the client request is fulfilled and/or data retrieved from the database.

8. The system of claim 1, wherein the cloud-based service comprises a hardware resource and/or a software resource that is remote to the client and accessible to the client via a wired and/or wireless network.

9. The system of claim 1, wherein the cloud-based service comprises an infrastructure as a service (IaaS), a platform as a service (PaaS), and/or a software as a service (SaaS).

10. The system of claim 1, wherein the one or more actions further includes a change to a state of the cloud-based service, and wherein the state of the cloud-based service comprises a quantity of active client sessions and/or a quantity of pending client requests.

11. A method, comprising:
  detecting a client request, the client request being sent from a client to a cloud-based service;
  detecting one or more actions triggered at the cloud-based service by the client request, the one or more actions including a first change to a database coupled with the cloud-based service;
  generating a test case for regression testing the cloud-based service, the test case including the client request, the test case further including an expected result of the client request, and the expected result of the client request comprising the first change to the database;
  regression testing the cloud-based service by at least executing the test case, the test case being executed by at least sending, to the cloud-based service, the client request included in the test case;
  determining an actual result of the client request by at least detecting an action triggered at the cloud-based service by the client request, the actual result of the client request comprising a second change to the database; and
  determining that the cloud-based service passes the test case based at least on a difference between the first change to the database and the second change to the database not exceeding a threshold value.

12. The method of claim 11, wherein the first change to the database comprises a change in a state of the database from a first state before the client request is fulfilled by the cloud-based service to a second state of the database after the client request is fulfilled by the cloud-based service, and wherein the change includes an addition of data to the database and/or a modification of data in the database.

13. The method of claim 11, wherein the detecting of the one or more actions comprises detecting a query to store, modify, and/or retrieve data from the database.

14. The method of claim 11, further comprising:
  detecting a response sent, in response to the client request, to the client from the cloud-based service, the client request and/or the response being detected by at least detecting an exchange of data between the client and the cloud-based service, the exchange of data conducted via a user interface generated by a presentation layer of the cloud-based service, and the response comprises a confirmation that the client request is fulfilled and/or data retrieved from the database; and
  generating the test case to include the response as part of the expected result of the client request.

15. The method of claim 11, wherein the one or more actions further includes a change to a state of the cloud-based service, and wherein the state of the cloud-based service comprises a quantity of active client sessions and/or a quantity of pending client requests.

16. A non-transitory computer-readable medium storing instructions, which when executed by at least one data processor, result in operations comprising:
  detecting a client request, the client request being sent from a client to a cloud-based service;
  detecting one or more actions triggered at the cloud-based service by the client request, the one or more actions including a first change to a database coupled with the cloud-based service;
  generating a test case for regression testing the cloud-based service, the test case including the client request, the test case further including an expected result of the client request, and the expected result of the client request comprising the first change to the database;
  regression testing the cloud-based service by at least executing the test case, the test case being executed by at least sending, to the cloud-based service, the client request included in the test case;
  determining an actual result of the client request by at least detecting an action triggered at the cloud-based service by the client request, the actual result of the client request comprising a second change to the database; and
  determining that the cloud-based service passes the test case based at least on a difference between the first change to the database and the second change to the database not exceeding a threshold value.

\* \* \* \* \*